(12) United States Patent
Cole et al.

(10) Patent No.: US 7,443,298 B2
(45) Date of Patent: Oct. 28, 2008

(54) DYNAMIC BOUNDARY MAPPING USING POSITION-DETERMINATION SYSTEMS

(75) Inventors: Alan G. Cole, Katonah, NY (US);
Jeffrey G. Elliott, Danbury, CT (US);
Holger H. Maier, Baden Wuerttemberg (DE); Paul A. Moskowitz, Yorktown Heights, NY (US); Amadeus Podvratnik, Baden Wuerttemberg (DE)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 11/354,496

(22) Filed: Feb. 15, 2006

(65) Prior Publication Data
US 2007/0188318 A1 Aug. 16, 2007

(51) Int. Cl.
G08B 1/00 (2006.01)
G08B 1/08 (2006.01)
G08B 13/14 (2006.01)
A01K 37/00 (2006.01)
A01K 15/04 (2006.01)
G06F 7/00 (2006.01)
G06F 19/00 (2006.01)

(52) U.S. Cl. .............. 340/572.4; 340/572.1; 340/572.7; 340/573.1; 340/573.4; 340/539.13; 340/539.2; 340/539.21; 340/686.1; 340/825.49; 119/712; 119/721; 700/214; 700/225; 235/384; 235/385; 235/492

(58) Field of Classification Search ... 340/572.1–572.8, 340/539.13, 539.2, 573.4, 825.49; 235/384–385, 235/492; 119/712, 721; 700/214, 225
See application file for complete search history.

(56) References Cited

U.S. PATENT DOCUMENTS 5,519,609 A 5/1996 Kuchenrither et al. ......... 702/5

(Continued)

Primary Examiner—George A Bugg
Assistant Examiner—Lam P Pham
(74) Attorney, Agent, or Firm—Michael J. Buchenhorner; Douglas W. Cameron

(57) ABSTRACT

The invention provides an approach for automatic and dynamic mapping of zone boundaries for position-determination systems. The system of the present invention utilizes beacons ("position determining devices") to identify the boundaries and limits of device area coverage ("zone") for tracking objects with a position-determination system. Beacons, used both to identify zone boundaries and to tag assets to be tracked, are distributed within the zone. The beacon locations are then detected and displayed in the visualization application. Three or more beacons may be linked together, either manually or automatically, to establish a detection zone. Using beacons to establish detection zone boundaries eliminates guesswork and its associated errors, and produces a zone boundary that is actually valid. In an improvement over present systems, greater accuracy is assured using zone-defining beacons, because if a beacon is unintentionally placed in an area unavailable to the position-determination system, that beacon will not appear in the visualization application display, and thus will not be available to create an incorrect zone representation.

21 Claims, 4 Drawing Sheets

U.S. PATENT DOCUMENTS

| | | | |
|---|---|---|---|
| 5,552,772 A * | 9/1996 | Janky et al. | 340/573.4 |
| 6,232,916 B1 * | 5/2001 | Grillo et al. | 342/357.07 |
| 6,581,546 B1 * | 6/2003 | Dalland et al. | 119/712 |
| 6,923,146 B2 * | 8/2005 | Kobitz et al. | 119/721 |
| 7,151,979 B2 * | 12/2006 | Andersen et al. | 700/214 |
| 2005/0066912 A1 | 3/2005 | Korbitz | 119/721 |
| 2005/0090971 A1 | 4/2005 | Bulatao | 701/200 |
| 2005/0162312 A1 | 7/2005 | Riday | 342/357.13 |
| 2005/0192752 A1 | 9/2005 | Rooney et al. | 702/5 |
| 2005/0229227 A1 | 10/2005 | Rogers | 725/115 |
| 2005/0246094 A1 | 11/2005 | Moscatiello | 701/207 |
| 2006/0022038 A1 * | 2/2006 | Hewlin et al. | 235/385 |
| 2006/0071790 A1 * | 4/2006 | Duron et al. | 340/572.1 |

* cited by examiner

DYNAMIC BOUNDARY MAPPING USING POSITION-DETERMINATION SYSTEMS

FIELD OF THE INVENTION

The invention disclosed broadly relates to the field of asset tracking, and more particularly relates to the field of dynamic mapping of boundaries in a position-determination system.

BACKGROUND OF THE INVENTION

Computer systems are becoming valuable tools in the management and tracking of assets, particularly the ability to locate assets with a defined area. "Location-aware" applications, which are enabled by position-determination systems, can track employees, vehicles, or other objects within a defined space. These location aware systems are becoming more common both within business enterprises and, to some extent, among individual consumers as well.

Location aware systems may track the location of persons or assets using a variety of methods and devices. For example, active or passive Radio Frequency Identification (RFID) tags, Ultra Wideband tags, Wireless Fidelity (Wi-Fi) beacons, and Global Positioning System (GPS)-enabled mobile phones, are among the devices that enable computation of an object's location through the analysis of radio frequency waves or similar mechanisms.

In location aware systems, it is often desirable to map out certain areas or "zones" for monitoring object locations. For example, in a safety monitoring application, a certain region of a chemical processing plant might be designated as a "hazardous zone," within which employees' locations are tracked for safety. Further, in some applications it may be desirable to designate a "privacy zone" within which persons or assets are not tracked, for reasons of personal privacy. Designation of a "security zone," such as an area near the exit of a facility, may assist in the retention of company assets. If a monitored asset, such as company projector or printer, enters the security zone, a notification alerts security personnel to the presence of the asset in the security zone. In another possible application, if a stock exchange, for example, requires that all trades in a given stock occur within a certain distance of a trading station, a "virtual zone" may be defined around the station, and the location of traders tracked over time relative to the zone. While these capabilities exist, defining the zones in location aware systems is a time consuming manual process, and thus often error-prone, One approach to defining a tracking zone is to measure the physical space of the zone. In this approach, someone must physically measure the zone boundaries, for example with a tape measure. Next, the user must convert these measurements into the coordinate system used by the location aware system. This is done, for example, by establishing one corner of a building as the origin of the coordinate system, with X and Y axes parallel to the sides of the building. The physical measurements are then entered into the location aware application, which can then detect objects within the defined zone, and perform the designated actions when a tracked item enters or leaves the zone.

A second approach is to start with a graphical computer display of a floor plan or map of the desired tracking zone. Using conventional computer-aided drawing tools, the zone of interest can be traced out on the computer screen. These measurements are then associated with the real-world coordinate system, and stored within the location aware system, where they may be used in the same way as physical measurements from the first approach.

Both these approaches are labor-intensive. It is especially difficult to be accurate in taking the measurements when the zones are in open areas devoid of walls or other barriers. Measurement or drawing errors are easy to make, hard to detect, and hard to correct.

The difficulty and likelihood of error increases for three-dimensional (3D) zones. Physically measuring the space and drawing it on a computer screen can be difficult.

Therefore, a need exists to overcome the labor intensive and error-prone process of defining zones for location aware systems. Thus, it is an object of the invention to provide a visualization application capable of automatically and dynamically establishing the boundaries of an object within an automatically and dynamically defined zone.

SUMMARY OF THE INVENTION

The invention provides an approach for automatic and dynamic mapping of zone boundaries for position-determination systems. The system of the present invention utilizes beacons ("position determining devices") to identify the boundaries and limits of device area coverage ("zone") for tracking objects with a position-determination system. Beacons, used both to identify zone boundaries and to tag assets to be tracked, are distributed within the zone. The beacon locations are then detected and displayed in the visualization application. Three or more beacons may be linked together, either manually or automatically, to establish a detection zone. Using beacons to establish detection zone boundaries eliminates guesswork and its associated errors, and produces a zone boundary that is actually valid. In an improvement over present systems, greater accuracy is assured using zone-defining beacons, because if a beacon is unintentionally placed in an area unavailable to the position-determination system, that beacon will not appear in the visualization application display, and thus will not be available to create an incorrect zone representation.

DESCRIPTION OF THE PREFERRED EMBODIMENT

While various embodiments of the present invention are discussed in detail below, it should be appreciated that the present invention provides inventive concepts that may be embodied in a wide variety of specific contexts. The specific embodiments discussed are merely illustrative of specific ways to make and use the invention, and do not limit the scope of the invention. In other instances, well-known features have not been described in detail so as not to obscure the invention.

Figure 1:
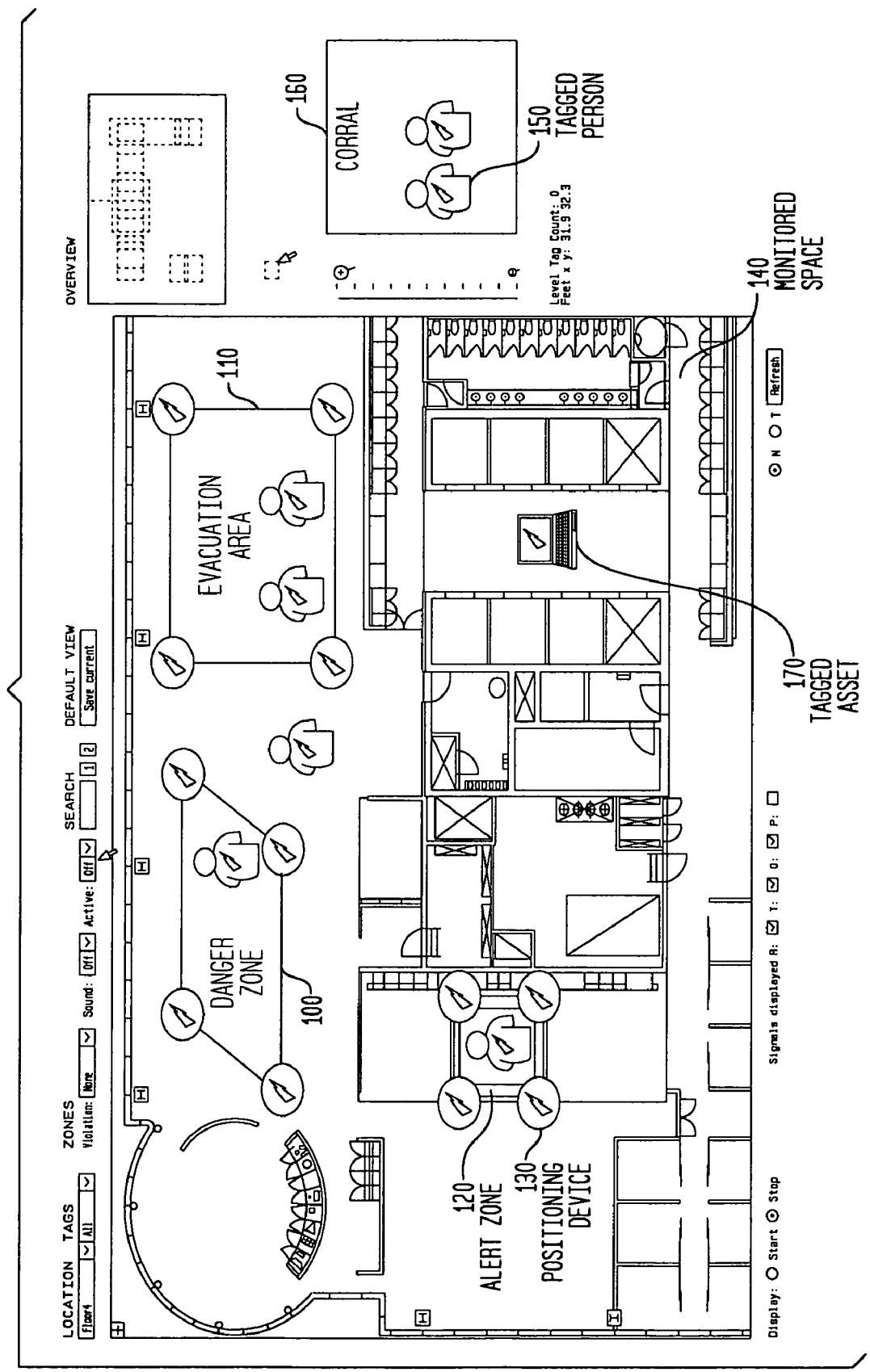
FIG. 1, shows a representation of an environment wherein a system in accordance with the invention may be used to an advantage.

Referring first to FIG. 1, there is shown a block diagram illustrating defined zones for use in a location aware system of at least one embodiment of the present invention. In the present invention, zones may be dynamic or static. FIG. 1 illustrates a user interface for a location aware asset monitoring computer application for use with at least one embodiment of the present invention. While the interface of FIG. 1 represents a computer graphic user interface, any type of display device may be used to implement the present invention. For example, a computer monitor, a flat panel display, a laptop computer, a hand-held computing device, a mobile phone with video display, a heads-up display device or hologram projector, among others, may be suitable visual representation devices to display the output of the system of the present invention.

In one exemplary embodiment of the present invention, the application displays a floor plan of a building, Monitored Space 140, with multiple monitoring zones defined by three or more Positioning Devices 130. Positioning Devices 130, also known as beacons, tags, or location devices, mark the boundaries of defined zones such as Alert Zone 120, Danger Zone 100 and Evacuation Area 110. Within Monitored Space 140, the location of objects, such as Tagged Asset 170 and Tagged Persons 150, may also be displayed and monitored on the Graphic User Interface (GUI) of the present invention.

FIG. 1 also includes a zone labeled Corral 160, shown containing two Tagged Persons 150. Corral 160 illustrates an optional "holding area" for items that cannot be exactly placed in Monitored Space 140. This might occur if Tagged Persons 150 or Tagged Asset 170 was located in a specific location that did not have coverage at any given moment. If Tagged Asset 170 or Tagged Persons 150 have not been located recently, their indicator may be displayed in optional Corral 160, so as not to misrepresent their current location on the display of Monitored Space 140. Corral 160 may also be used to represent "missing" assets or persons, similar to a "check out" board seen in some offices. If Tagged Person 150 left Monitored Space 140 to go home, for example, displayed Tagged Person 150 in Corral 160 indicates the person is an unavailable asset.

Referring again to FIG. 2, this figure illustrates an overall architecture of the system of at least one embodiment of the present invention. Here Positioning Device 130 and Position Server 220 illustrate an exemplary positioning device determination system. Each Positioning Device 130 provides its location to Position Server 220, a computer that performs geometric calculations on the timing information and known reader locations to compute the location of each Positioning Device 130 within the coordinate system.

Information about the location of Positioning Device 130 is forwarded to the software application of the present invention where it is smoothed, filtered, and, if necessary, transformed to the appropriate coordinate system. The location information (Tag Data 230) is stored in Database 275, via Database Access Layer 270, for archival and auditing purposes, and Location Event 250 is forwarded to Business Rule Evaluator 290, which determines whether special alerts should be triggered by Location Event 250, depending on the business rules of the system. All location events, transformed for the proper coordinate system, are processed by Location State Cache 295 and stored in Event Database 285 by Event Server 280 for future reference. For example, a rule may require an alert when a non-safety-trained employee enters a hazardous area. Location Event 250, together with any associated alerts, is sent to Application Client Side GUI 299 via Application Server 298, which displays Positioning Device 130's location on a map of the floor plan of the facility.

Figure 2:
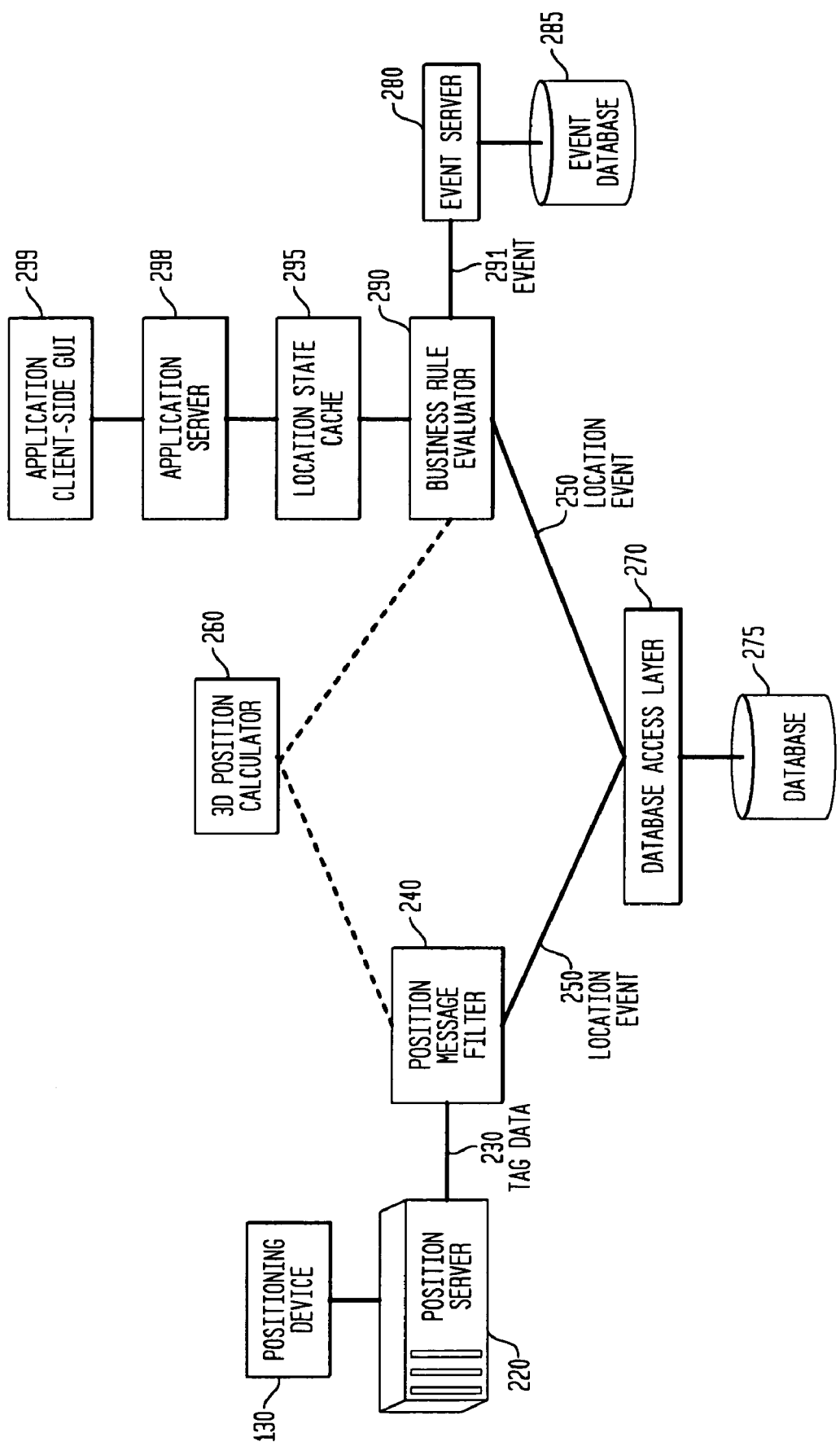
FIG. 2 is an illustration of a block diagram of the elements of a computer software system according to the present invention.

If the area to be monitored is a 3D space (for example, multiple floors of an office building) it is desirable to perform calculations necessary to handle the position computations in 3D using 3D Position Calculator 260, which is available to one or more modules of the software of the present invention, an example of which is illustrated in FIG. 2.

A position-determination system capable of supporting the present invention may have multiple embodiments. In FIG. 2, Positioning Device 130, Position Server 220 and Position Message Filter 220 represent the position-determination system. In this embodiment, Positioning Device 130 may be any type of tag or other positioning device, including those referenced above such as radio transponders, Ultra-Wide Band ("UWB") transmitters, RFID tags, GPS receivers, or other position determining technology well known to those of ordinary skill in the art. Some technologies appropriate for implementing Positioning Device 130, as listed above, actively broadcast location information at periodic intervals. In other technologies, Positioning Device 130 is passive, responding only when provoked.

In a system of the present invention, active tags or passive tags, or any combination thereof, may be employed. There need be no distinction between a tag used to locate a tagged asset and a tag used to locate a zone boundary. The tag may be placed on a static boundary, such as a wall, or on a dynamic boundary, such as a floating positioning device, and it will report its location to Position Server 220. FIG. 1 depicts such an embodiment.

Figure 4:
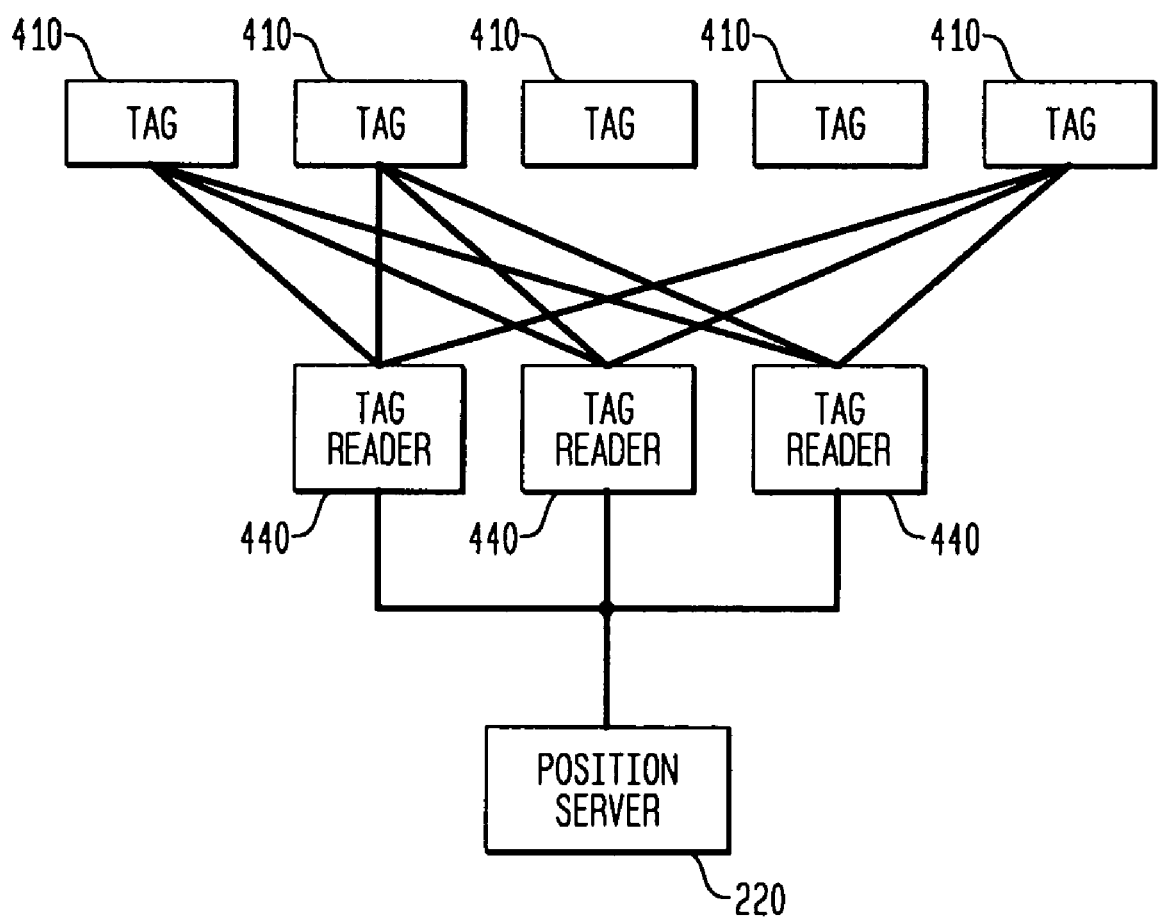
FIG. 4 illustrates the configuration of a possible position determination system which may be used to implement one or more embodiments of the present invention.

In some embodiments of the present invention, the tag technology may require that the system include tag readers capable of determining tag position. FIG. 4 illustrates a position determining system using such a tag technology. Here, at least three of Tag Reader 440 are used to detect the location of Tag 410. Each Tag Reader 440 reports the identity and time of detection of each Tag 410 to Position Server 220. By a prior registration process performed during zone definition, the system of the present invention knows the location of each Tag Reader 440. Thus, given the input of at least three Tag Reader 440s, the invention can triangulate to determine the absolute coordinates of Tag 410 within the Monitored Space 140, and display it on Application Client Side Graphical User Interface ("GUI") 299. Thus, in such an embodiment, the Tag 410 fulfills the function of Positioning Device 130.

For the purposes of illustration herein, the tag embodiment described in [0024] will be used to illustrate the invention, equating the tag as Positioning Device 130. However, nothing herein limits the present invention to only one type of tag technology, which can be freely mixed in the present invention. Further, one of ordinary skill in the art will understand that other tag technologies are also encompassed by the description and claims herein.

Once registered with the system, the locations of static Positioning Devices 130 are established and made known to Position Message Filter 240 and in due course to Location State Cache 295. Next, the zone boundaries may be defined relative to the Monitored Space 140, either calculated automatically, or registered to the system by a manual process such as interacting with the computer application display using techniques such as point-and-click which are well known to those of ordinary skill in the art.

After the zones are defined relative to the static Positioning Devices 130, Business Rules may be established relative to these zones. Position Message Filter 240 may be used to filter the location of static tags, preventing Tag Data 230 from generating Location Event 250 for static tags. For tags attached to Tagged Persons 150 and Tagged Asset 170, Position Message Filter 240 passes on Location Event 250 to Database 275 via Database Access Layer 270. Location Event 250 is then passed on to Business Rule Evaluator 290. Depending on the Rule or Rules triggered, the system may generate Event 291 for storage in Event Database 285, and which passes on the change in location of the tag to Application Server 298, which will provide information to Application Client Side GUI 299.

In FIG. 1, the location of Tagged Asset 170 and Tagged Persons 150 in the building are displayed relative to the building floor plan, through the Application Client Side GUI 299. Each Tagged Person 150 and Tagged Asset 170 is associated with a location (coordinate) on the GUI interface based on and relative to its actual position in Monitored Space 140. For example, each of the four corners of Alert Zone 120 contains a Positioning Device 130, which defines the square Alert Zone. The same is true of parallelogram-shaped Danger Zone 100, and the rectangular Evacuation Area 110. It will be understood by one of ordinary skill that three or more positioning devices may be required to define a planar enclosed space, and four or more positioning devices to define a volume-enclosed space.

As a further feature of the present invention, Positioning Devices 130 may further include environmental sensors, such as sensors for temperature, poison gas, or radioactive material. Such sensors may be used to detect an elevated temperature in a computer room, for example.

The system of the present invention may issue a warning or notification when certain objects pass over a zone boundary or are detected either inside or outside a zone. The type of notification would depend on the Business Rules associated with that particular zone. The system of the present invention may also issue a warning when environmental or other sensors, which may be associated with Positioning Device 130, detect certain conditions within a defined zone. In a dynamic boundary example, a detection of dangerous material, such as poison gas, radioactive material, or radiation along the perimeter or within a defined zone, may be dynamically defined as Danger Zone 100, causing the system to issue the appropriate warning based on the Business Rules associated with a Danger Zone.

Because boundary tags within the system of the present invention may move within Monitored Space 140 while being monitored, just as the asset and person tags may move, the boundary tags may dynamically define new boundaries for a zone. This is an improvement in the art, allowing for significantly better object location monitoring. For example, if Danger Zone 100 is defined by floating Positioning Devices 130 intending to monitor an oil spill and Positioning Devices 130 are carried about by ocean currents, Danger Zone 100 will be a zone defined by dynamic boundaries. The boundaries are monitored by the current location of Positioning Devices 130, which is automatically monitored in real time by the computer application of the present invention. Another example of a dynamic boundary application would be a monitor for poison or radioactive gas carried by the wind, where Positioning Devices 130, carried by weather balloons, would move with the gas, defining a dynamic Danger Zone 100.

The present invention also contemplates organizations wishing to define Privacy Zones within the Monitored Space 140. Such zones may be established to protect privacy or security of employees or assets. In these zones, a tagged person or asset will not appear on the user interface display. One example of a Privacy Zone would be a restroom. Another embodiment of a Privacy Zone might be a zone where location information is restricted using a tiered access model, such that only employees of a given privilege or security level may have access to the asset tracking information within the zone. Such systems may be implemented to protect trade secrets, secure information, provide employee privacy, protect private data, hide very valuable assets, or protect any other implementation where levels of access to asset location information in desired.

In at least one embodiment of the present invention, it is preferable to define numerous zones, such as hazardous areas and safety areas where employees are to evacuate in case of emergency. It was further preferred to define restrooms as privacy areas where tracking is not monitored. The zones associated with the given floor plan are optionally shown on the computer screen, super-imposed over the floor plan.

Figure 3:
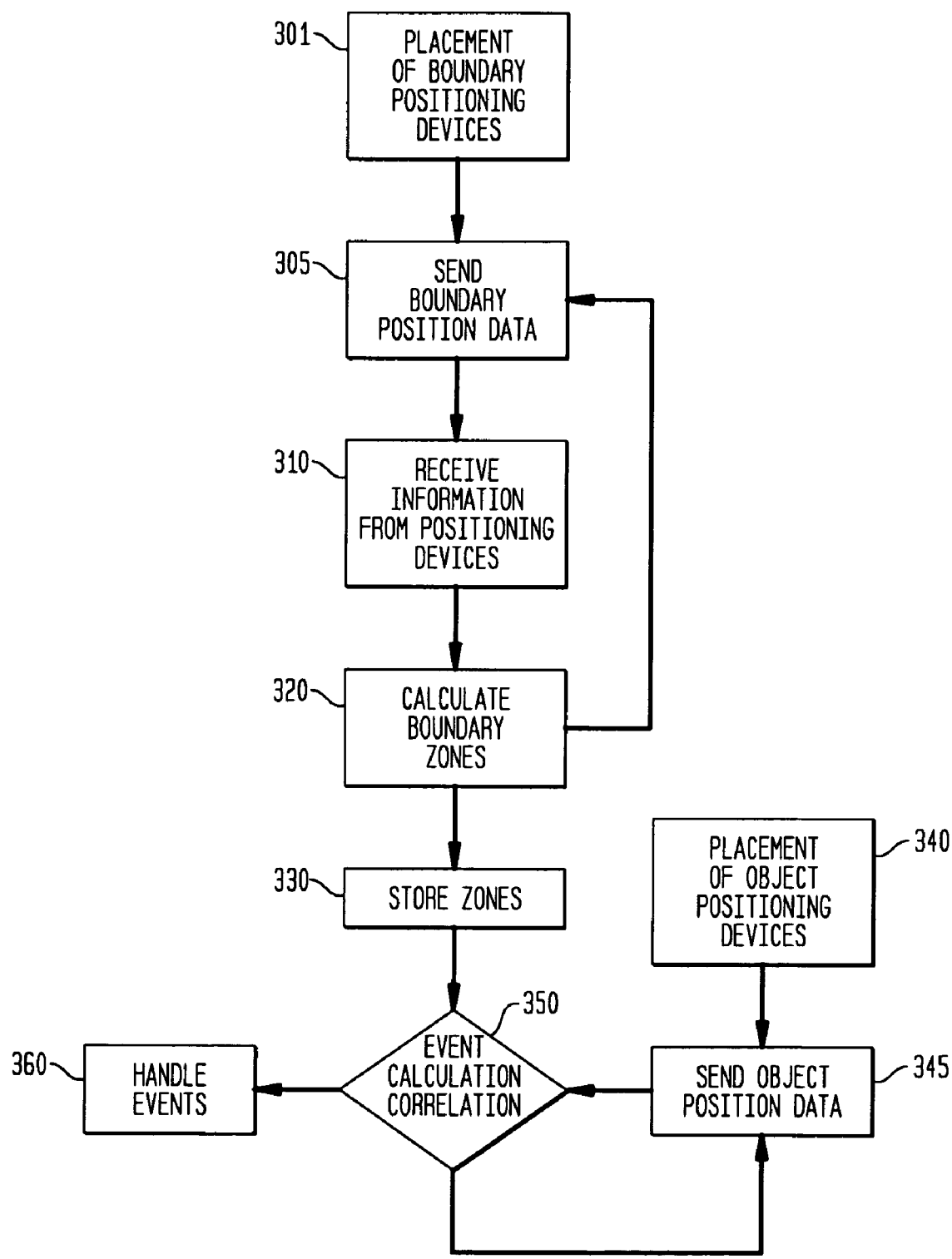
FIG. 3 is a flow chart illustrating a method according to the present invention.

FIG. 3 illustrates a possible Runtime Logical Architecture for at least one embodiment of the present invention. In this embodiment, active tags are not just used for identifying an object and its location but also for creating boundaries that define polygon zones or areas to be monitored for events. These boundaries can be static, such as the corners of a building, or dynamic such that they change the real-time, and the associated visualization of the zone also changes in real-time, along with the indications of events monitored in real-time.

In step 301, boundary-positioning devices (Positioning Devices 130) may be placed in the area Monitored Space 140. For example, floating active markers may be placed around an oil spill. In step 305, Positioning Devices 130 transmits position data to the system of the present invention. In step 310, the data is received and then, in step 320, sent to a computing device to calculate the boundaries of the zones. The location of each Positioning Device 130 becomes a point on the perimeter of a zone that defines a polygon. At step 330, the zone information may be stored in Event Database 285 for later event correlation. Once zones are defined and registered with the system, Positioning Devices 130 intended as object tags are placed on their associated objects, as in step 340. The objects may be Tagged Persons 150 or Tagged Asset 170, or any other object to be tracked. At step 345, the location information for the Positioning Devices associated with the Tagged Persons 150 and Tagged Assets 170 is sent to the event calculation correlation step 350, which also obtains the stored zone polygon data. In step 350, a determination may be made if the object is within or outside any defined zone. In a preferred embodiment, this is done by a calculation known as "point in a polygon." Finally, the Events 291 are handled in step 360 based satisfying rules in the rule set. If a rule is satisfied, an alert may be issued by the system and may be displayed on GUI 299. If Position Devices 130s marking a zone boundary move, then the system dynamically recalculates the boundary zone by reentering step 320 and a recalculation of the event correlation at step 350 is repeated. Similarly, the Position Device location data may change, causing reentry into step 345. Such a change may also result in a recalculation of the event correlation at step 350.

The following table provides examples of Business Rules that might be triggered when evaluating Location Event 250.

| Rule | Triggering Event |
| --- | --- |
| don't enter | occurs when a tag enters a zone |
| don't exit | occurs when a tag leaves a zone |
| too many | occurs when count threshold is reached |
| not enough | occurs when count threshold is not reached (over some time frame) |
| too close | occurs when tags are too close to one another - e.g., welder & gas tank |
| too far | occurs when tags are too distant from one another - e.g., visitor & escort |

-continued

| Rule | Triggering Event |
|---|---|
| good mix | occurs when tags are mix in a correct ratio - e.g., people & equipment |
| bad mix | occurs when tags are mix in an incorrect ratio |
| too long | occurs when a time threshold is reached |
| too short | occurs when time threshold is reached |
| too high | occurs when tag exceeds z threshold (3rd dimension of zone) |
| too low | occurs when tag exceeds z threshold (3rd dimension of zone) |
| too fast | occurs when a speed threshold is exceeded |
| too slow | occurs when a speed threshold is exceeded |

Possible applications contemplated for the present invention include but are not limited to:

Continuously tracking a particular positioning device, such as one attached to a product case or pallet within an enterprise, or even across supply chain;

Receiving of goods at a dock, matching the incoming tag stream against a pre-defined list and printing a verification of receipt;

Monitoring products which may fall off a conveyor belt. This application would require rules to test the non-occurrence of a sequence of events, as well as require multiple tag readers placed along the conveyor belt;

Monitoring perishable goods which might otherwise get stuck in an undesirable location, such as storage;

Detecting theft in a retail application, where the system might raise an alarm if a tagged item is detected at the store exit, but was not previously detected at a check out counter;

Automatic monitoring of case-pallet tag association: Where a pallet with multiple cases is pushed through a tag reader in a packing station, the business rule evaluator may monitor the sequence of positioning device location changes for tags attached to cases and to the pallet, associating the case to the pallet and allowing automatic monitoring of the location of each case relative to the pallet.

Thus has been described a system and visualization application capable of automatically and dynamically establishing the boundaries of an object within an automatically and dynamically defined zone. While what has herein been described is what is presently considered to be one or more preferred embodiments, it will be understood by those skilled in the art that other modifications can be made within the spirit of the invention, as claimed herein.

We claim:

1. An information handling system, comprising:
   a plurality of positioning devices;
   at least one receiver capable of determining a location of each of said plurality of positioning devices relative to a coordinate system;
   a data store coupled to said receiver for storing said locations;
   a visual representation device coupled to said data store and programmed to visually depict the location of said plurality of positioning devices relative to said coordinate system; and
   a method of joining said locations of at least three of said positioning devices to define at least one monitoring zone for depiction via said visual representation device.

2. The system of claim 1, further comprising:
   a method for registering a least one positioning device with said system.

3. The system of claim 2, further comprising:
   a visual representation of a holding area for depicting said at least one positioning device registered with said system and whose location relative to said coordinate system is unavailable to said system.

4. The system of claim 2, further comprising:
   a method of defining at least one private monitoring zone wherein said location of said at least one positioning device located in said private zone is unavailable via said visual representation device.

5. The system of claim 4, further comprising:
   a method of allowing tiered access to information about said plurality of positioning devices located in said private zone.

6. The system of claim 1 further comprising a filter coupled to said receiver capable of distinguishing static from non-static positioning devices.

7. The system of claim 1 further comprising:
   a rule processor coupled to said database and capable of triggering a notification when said location of said at least one positioning device satisfies at least one rule of said system.

8. The system of claim 1, further comprising:
   a method of associating said monitoring zone boundaries with a conditional requirement.

9. The system of claim 7 wherein, said conditional requirement varies over time said location of said boundaries within said coordinate system.

10. The system of claim 7 wherein, said conditional requirement varies in space said location of said boundaries within said coordinate system.

11. The system of claim 7 wherein, said conditional requirement varies said location of said boundaries within said coordinate system according to said satisfied rule.

12. A method for dynamic boundary mapping comprising:
    placing a plurality of positioning devices within a monitored space;
    determining boundaries of a monitored space relative to a coordinate system;
    calculating a zone of enclosed space within said monitored space as defined by at least three of said plurality of positioning devices;
    identifying an object associated with a first positioning device of said plurality of positioning devices;
    determining whether said object is within zone boundaries of said zone;
    displaying a visual representation of the location of said identified object within said monitored space relative to said coordinate system.

13. The method of claim 12 wherein at least one of said plurality of positioning devices is selected from the group consisting of: a radio transponder, an ultra wideband transmitter, a Radio Frequency Identification device, and a Global Positioning System receiver.

14. The method of claim 12 wherein the locations of at least four of said plurality of positioning devices defines a volume-enclosed space.

15. The method of claim 12 wherein said object is a tagged person.

16. The method of claim 12 wherein a type of said zone is selected from the group consisting of: an alert zone an evacuation zone, a danger zone, a safety zone and a privacy zone.

17. The method of claim 12 wherein at least one of said plurality of positioning devices further comprises an environmental sensor.

18. The method of claim 12 further comprising:

processing rules when said object crosses a zone boundary; and issuing a notification when said crossing satisfies at least one rule of said processed rules.

19. The method of claim 17 further comprising:

issuing a notification when a reading from said environmental sensor satisfies at least one rule of said processed rules.

20. A computer-readable medium having computer-executable instructions for performing a method comprising:

placing a plurality of positioning devices within a monitored space;

determining the boundaries of a monitored space relative to a coordinate system;

calculating a zone of enclosed space within said monitored space as defined by at least three of said plurality of positioning devices;

identifying an object associated with a first positioning device of said plurality of positioning devices;

determining whether said object is within said zone;

displaying a visual representation of the location of said identified object within said monitored space relative to said coordinate system.

21. The computer-readable medium of claim 20 further comprising:

a visual representation of a holding area for depicting said at least one positioning device registered with said system and whose location relative to said coordinate system is unavailable to said system.

* * * * *